(12) United States Patent
Jenkner et al.

(10) Patent No.: US 9,190,903 B2
(45) Date of Patent: Nov. 17, 2015

(54) SYSTEM AND METHOD FOR A CONTROLLED FEEDBACK CHARGE PUMP

(71) Applicant: Infineon Technologies AG, Neubiberg (DE)

(72) Inventors: Christian Jenkner, Klagenfurt (AT); Richard Gaggl, Poertschach am (AT)

(73) Assignee: Infineon Technologies, AG, Neubiberg (DE)

( * ) Notice: Subject to any disclaimer, the term of this patent is extended or adjusted under 35 U.S.C. 154(b) by 0 days.

(21) Appl. No.: 14/137,014

(22) Filed: Dec. 20, 2013

(65) Prior Publication Data

US 2015/0180333 A1   Jun. 25, 2015

(51) Int. Cl.
*G05F 1/10* (2006.01)
*G05F 3/02* (2006.01)
*H03K 3/38* (2006.01)
*H02M 3/07* (2006.01)

(52) U.S. Cl.
CPC ........................... *H02M 3/07* (2013.01)

(58) Field of Classification Search
USPC .............. 327/534–543, 148, 157; 363/59–60
See application file for complete search history.

(56) References Cited

U.S. PATENT DOCUMENTS

| | | | | |
|---|---|---|---|---|
| 7,123,079 B2 * | 10/2006 | Do | ................................ | 327/536 |
| 7,180,796 B2 * | 2/2007 | Tanzawa et al. | ......... | 365/189.09 |
| 8,462,578 B2 * | 6/2013 | Neto et al. | .................. | 365/233.1 |
| 2011/0018616 A1 * | 1/2011 | Li et al. | ......................... | 327/536 |
| 2012/0300552 A1 * | 11/2012 | Neto et al. | ............... | 365/185.18 |
| 2013/0051583 A1 * | 2/2013 | Gueorguiev | ................... | 381/111 |
| 2013/0279721 A1 * | 10/2013 | David et al. | .................... | 381/123 |

* cited by examiner

*Primary Examiner* — Brandon S Cole
(74) *Attorney, Agent, or Firm* — Slater & Matsil, LLP

(57) ABSTRACT

According to various embodiments, a circuit includes a charge pump and a feedback circuit. The charge pump includes a first input, a second input configured to receive an offset signal, and an output terminal configured to provide a charge pump signal based on the first and second inputs. The feedback circuit includes a first input coupled to the output of the charge pump, a second input configured to be coupled to a reference signal, an enable input configured to enable and disable the feedback circuit, and a feedback output coupled to the first input of the charge pump.

26 Claims, 11 Drawing Sheets

SYSTEM AND METHOD FOR A CONTROLLED FEEDBACK CHARGE PUMP

TECHNICAL FIELD

The present invention relates generally to electronic circuits, and, in particular embodiments, to a system and method for a controlled feedback charge pump.

BACKGROUND

A charge pump is a voltage converter that uses capacitors as energy storage elements to create either higher or lower voltages. Applications of charge pumps are wide spread in power sources and other applications. In particular, a specific application of a charge pump includes generating a bias voltage in a microelectromechanical system (MEMS) microphone.

In general, charge pumps use some form of switching device to control the connection of voltages to the capacitor. For example, a higher voltage can be derived from a lower voltage in two steps. In a first step, a capacitor is connected across the supply and charged to the supply voltage. In a second step, the circuit is reconfigured so that the capacitor is in series with the supply to a load. Ignoring leakage effects, this example method effectively doubles the supply voltage to the load (the sum of the original supply and the capacitor). The pulsing nature of the higher voltage output may be smoothed by the use of an output capacitor as a filter. The control of the switching device is generally driven by a secondary switching circuit.

Charge pumps are often used for transducers, among numerous other examples. Transducers convert signals from one domain to another and are often used in sensors. A common sensor with a transducer that is seen in everyday life is a microphone, a sensor that converts sound waves to electrical signals. A particular family of transducers produced using micromachining techniques are referred to as MEMS transducers, such as a MEMS microphone, for example.

Many MEMS transducers, and particularly MEMS microphones, often use capacitive sensing techniques for measuring a physical phenomenon of interest. In such applications, the capacitance change of the capacitive sensor is converted into a usable voltage using interface circuits. In such capacitive transducer systems, the transducer sensitivity may be related to a bias voltage applied to the transducing element. In such applications, a charge pump may be used to apply a bias voltage to the transducing element.

SUMMARY OF THE INVENTION

According to various embodiments, a circuit includes a charge pump and a feedback circuit. The charge pump includes a first input, a second input configured to receive an offset signal, and an output terminal configured to provide a charge pump signal based on the first and second inputs. The feedback circuit includes a first input coupled to the output of the charge pump, a second input configured to be coupled to a reference signal, an enable input configured to enable and disable the feedback circuit, and a feedback output coupled to the first input of the charge pump.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely charge pumps, and more particularly, charge pumps used to bias transducers and MEMS transducers. Some of the various embodiments described herein include charge pumps; charge pumps in transducer systems and microphone systems; and interface circuits for transducer systems, MEMS transducer systems, and MEMS microphones. In other embodiments, aspects may also be applied to other applications involving any type of charge pump and electronic circuit according to any fashion as known in the art.

According to some embodiments, particularly related to charge pumps systems for transducer elements, a charge pump provides a voltage bias to a transducer, such as a MEMS microphone, for example. In such embodiments, the sensitivity of a transducer is directly related to the voltage bias applied by the charge pump. In order to control the sensitivity of the transducer, a feedback circuit may be used to regulate the output of the charge pump. Additionally, an offset voltage may be applied to the transducer from another source. Various circuit conditions including voltage supply variations, large signals, and shock events may disrupt both the voltage bias and the offset voltage applied to the transducer and alter the sensitivity. Thus, in some embodiments, an offset voltage is coupled to the charge pump in order to improve the stability of the voltage bias applied via the charge pump to the transducer. In various embodiments, the feedback loop may be disabled during certain modes of operation. In particular, some transducers may include power efficient or low power applications. In such embodiments, disabling the feedback loop during steady state operation, i.e. once the charge pump output nears a steady state value, may serve to reduce power consumption.

According to embodiments as described herein, a charge pump includes a feedback circuit and is controlled by an offset voltage signal and the feedback circuit. The feedback circuit is configured to compare the output of the charge pump with a reference voltage signal and generate a feedback signal for the charge pump during an operational mode. The feedback circuit may be enabled or disabled by an enable signal during a low power mode. In some embodiments, the charge pump is coupled to a transducer, such as a MEMS microphone, and the offset voltage signal is applied to both the charge pump and the transducing element of the transducer.

Figure 1:
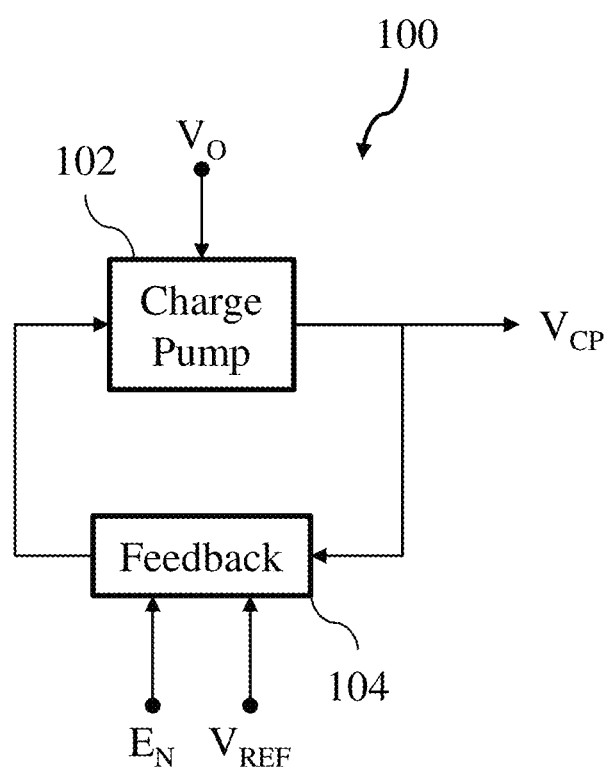
FIG. 1 illustrates a block diagram of an embodiment charge pump system.

FIG. 1 illustrates a block diagram of an embodiment charge pump system 100 including charge pump 102 and feedback loop 104. According to various embodiments, charge pump 102 receives an offset voltage signal $V_O$ and an input from feedback loop 104. Feedback loop 104 may receive three input signals: output voltage signal $V_{CP}$, reference voltage signal $V_{REF}$, and enable $E_N$. In various embodiments, charge pump 102 generates output voltage signal $V_{CP}$ based on offset voltage signal $V_O$ and the input from feedback loop 104. Feedback loop 104 may compare output voltage signal $V_{CP}$ with $V_{REF}$ and generate the feedback signal for charge pump 102 based on the comparison. According to some embodiments, enable $E_N$ may function to enable and disable feedback loop 104. Enable $E_N$ may be generated by an external controller or, in some embodiments, enable $E_N$ may be generated within feedback loop 104, such as within a counter, for example.

As will be discussed further below, in some specific embodiments, the combination of offset voltage signal $V_O$ and output voltage signal $V_{CP}$ is equal to a bias voltage applied to a MEMS microphone. In some embodiments, the sensitivity of the MEMS microphone is directly related to this bias voltage applied. In various embodiments, providing offset voltage signal $V_O$ to both charge pump 102 and a MEMS microphone will cause the applied bias voltage, and therefore the sensitivity, to be less affected by changes in offset voltage signal $V_O$.

Figure 2:
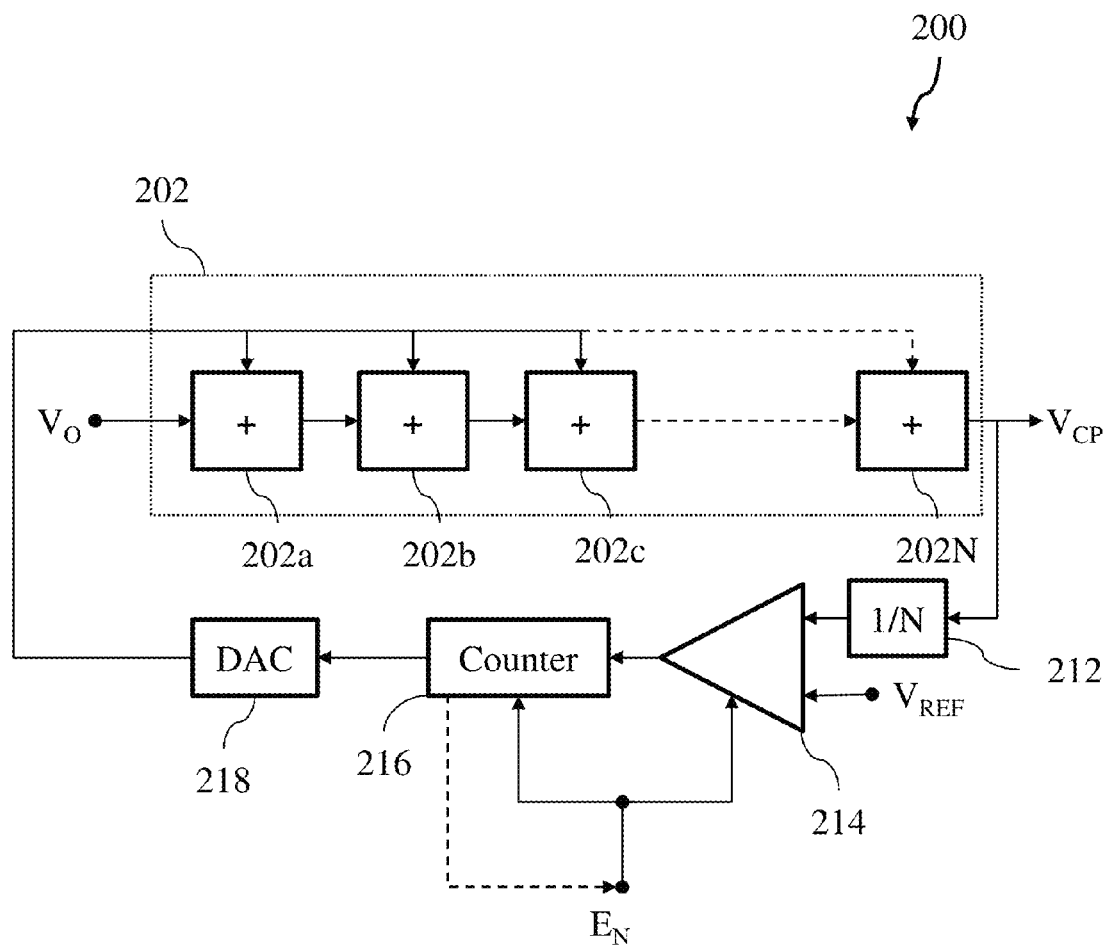
FIG. 2 illustrates a more detailed block diagram of an embodiment charge pump system.

FIG. 2 illustrates a more detailed block diagram of an embodiment charge pump system 200 including charge pump 202 with charge pump stages 202a-202N and a feedback loop with divider block 212, operational amplifier 214, counter 216, and digital to analog converter (DAC) 218. In other embodiments, the feedback loop could be implemented with other components, such as another implementation of a proportional-integral-derivative (PID) control circuit with a comparator. According to various embodiments, charge pump stage 202a receives offset voltage $V_O$ and charge pump stages 202a-202N receive an output of DAC 218. The combined output of charge pump stages 202a-202N produces output voltage $V_{CP}$. The elements of the feedback regulate output voltage $V_{CP}$ by shifting the output of DAC 218. Divider block 212 divides output voltage $V_{CP}$ and operational amplifier 214 compares output voltage $V_{CP}$ to reference voltage $V_{REF}$. Counter 216 increments or decrements by discrete steps in response to the output of operational amplifier 214 and DAC 218 converts the digital counter value to an analog feedback signal for charge pump stages 202a-202N. The feedback maintain output voltage $V_{CP}$ about equal to $V_O+N*V_{REF}$. Charge pump 202 may be any type of charge pump, but is depicted as a multistage charge pump having N charge pump stages 202a-202N. As shown, output voltage signal $V_{CP}$ is fed into divider block 212. Output voltage signal $V_{CP}$ may also be referred to as charge pump signal $V_{CP}$. In an embodiment, divider block 212 divides output voltage signal $V_{CP}$ by a first value. In a specific example, the first value is equal to the number of stages N in charge pump 202.

After output voltage $V_{CP}$ is divided by the first value, the result may be compared to reference voltage $V_{REF}$ by operational amplifier 214, which may be implemented as a comparator. The result of the comparison may be fed to counter 216, which may increment or decrement the output based on the comparison signal received. The output of counter 216 may be a digital value that may be fed to DAC 218 and converted to an analog value for input into charge pump stages 202a-202N.

In the embodiment shown, each charge pump stage 202a-202N receives an input from DAC 218 in the feedback loop. Charge pump stages 202a-202N may be implemented as any type of charge pump stage. As shown, charge pump stages 202a-202N are simply additive. In steady-state operation, or once the feedback loop stabilizes, the output of DAC 218 may approach reference voltage $V_{REF}$. In such an embodiment, the output of the charge pump stages, i.e. output voltage $V_{CP}$, may be given by the expression $V_{CP}=V_O+N \cdot V_{REF}$. In other embodiments, charge pump 202 and charge pump stages 202a-202N may be designed to output any voltage signal according to various other expressions as is known in the art. More specific embodiments of charge pump stages 202a-202N will be described below in reference to the other figures.

According to various embodiments, enable $E_N$ enables and disables the feedback loop. Enable $E_N$ may enable or disable operational amplifier 214 and counter 216, as shown. In some embodiments, enable $E_N$ connects or disconnects the power supply to operational amplifier 214 and counter 216. In other embodiments, enable EN disables operation, such as switching, in counter 216. Enable $E_N$ may be coupled to any part of the feedback loop and functions to enable and disable the feedback loop. Further, the feedback loop shown is just one example of many possible example embodiments, thus any type of feedback loop may be implemented and enable $E_N$ functions to enable and disable any type of feedback loop used. In certain embodiments, disabling the feedback loop conserves power.

As shown in FIG. 2, enable $E_N$ may originate as a control signal from another circuit or block, such as an external controller. In other embodiments, enable $E_N$ may originate from within the feedback loop. In one embodiment, enable $E_N$ originates from counter 216 as indicated by the dotted line.

Figure 3:
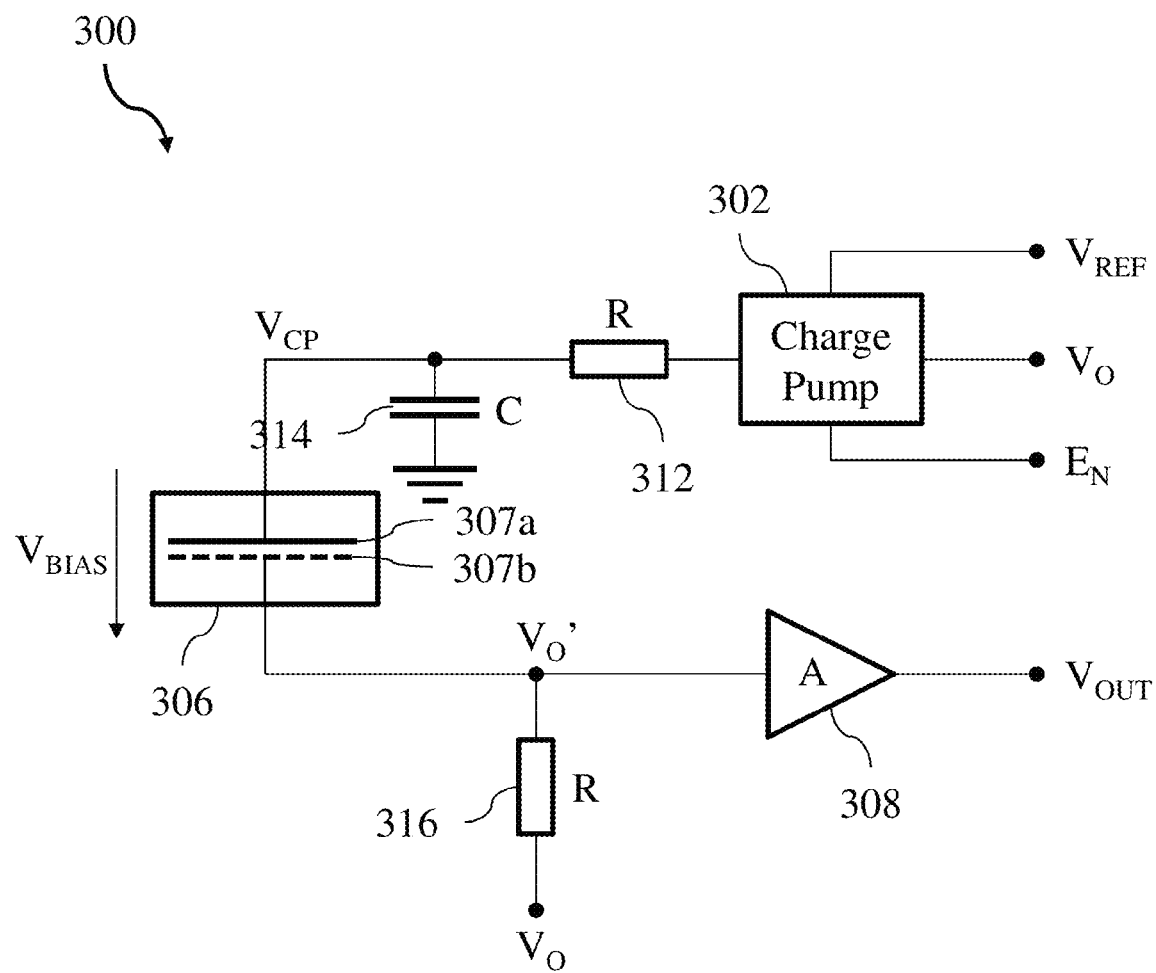
FIG. 3 illustrates a block diagram of an embodiment transducer system with a charge pump.

FIG. 3 illustrates a block diagram of an embodiment transducer system 300 including charge pump 302, a MEMS microphone 306, and an amplifier 308. According to various embodiments, charge pump 302 receives voltage reference signal $V_{REF}$, offset voltage signal $V_O$, and enable $E_N$. These input signals and charge pump 302 may function according to any of the embodiments described herein and in reference to any other figures. Charge pump 302 may provide charge pump signal $V_{CP}$ to MEMS microphone 306. In some embodiments, charge pump 302 is coupled to MEMS microphone 306 by resistor 312 and capacitor 314, which provides some filtering of charge pump signal $V_{CP}$.

MEMS microphone 306 includes a deflectable membrane 307a and a rigid backplate 307b, as shown. Membrane 307a and backplate 307b may be connected as shown or be flipped and connected in an opposite fashion. In various embodiments, bias voltage $V_{BIAS}$ is applied across MEMS microphone 306. Bias voltage $V_{BIAS}$ sets the sensitivity of MEMS microphone 306 and, in some embodiments, the sensitivity is directly proportional to the bias voltage $V_{BIAS}$. In the embodiment shown, the bias voltage is given by $V_{BIAS}=V_{CP}-V_O'$. In some embodiments, very little current flows into or out of MEMS microphone 306 during some modes of operation. As such, the current through resistor 316 is low or nearly zero, making $V_O' \approx V_O$. For example, the effective resistance for current flowing through MEMS microphone 306 in such embodiments may be about 100 GΩ. As shown, amplifier 308 is also coupled to MEMS microphone 306 and resistor 316. Amplifier 308 may provide an output voltage $V_{OUT}$ and may have a gain A, such as a unity gain or any other gain value.

In the embodiment shown, offset voltage signal $V_O$ and charge pump signal $V_{CP}$ set bias voltage $V_{BIAS}$, as mentioned above. Offset voltage signal $V_O$ is also coupled to charge pump 302, as shown. In some embodiments, and as mentioned above in reference to charge pump 202, charge pump 302 produces a charge pump signal $V_{CP}$ related to offset voltage signal $V_O$. In one embodiment, charge pump 302 produces an output given by the expression $V_{CP}=V_O+N \cdot V_{REF}$, or an approximation thereof. In such an embodiment, an expression for the bias voltage may be determined by substituting the expression for $V_{CP}$ into the equation for $V_{BIAS}$, yielding the expression $V_{BIAS}=V_O+N \cdot V_{REF}-V_O'$ ($\approx V_O)=N \cdot V_{REF}$. Thus, in various embodiments, providing offset voltage signal $V_O$ to both charge pump 302 and MEMS microphone 306 causes the applied bias voltage $V_{BIAS}$, and therefore the sensitivity, to be insensitive or less sensitive to changes in offset voltage signal $V_O$.

For example, in some embodiments, offset voltage $V_O$ may be trimmed or modified for different applications. In various embodiments, offset voltage $V_O$ ranges between 1.6V and 3.6V. In alternative embodiments, offset voltage $V_O$ may be outside this range. In some embodiments, offset voltage $V_O$ biases amplifier 308. Biasing amplifier 308 may be dependent on a supply voltage and may be controlled to optimize the range for the input signal swing for amplifier 308. For example, a higher supply voltage may correspond to a higher offset voltage $V_O$ and a larger voltage swing, while a lower supply voltage may correspond to a lower offset voltage $V_O$ and a smaller voltage swing. Thus, in various embodiments, offset voltage $V_O$ is set to optimize range for input signal swing. In such embodiments, bias voltage $V_{BIAS}$ remains constant as offset voltage $V_O$ is modified because offset voltage $V_O$ is supplied to both the input of amplifier 308 and the input of charge pump 302. Thus, bias voltage $V_{BIAS}$ is equal to $N \cdot V_{REF}$ and is insensitive to changes in offset voltage $V_O$ as explained above.

Figure 4:
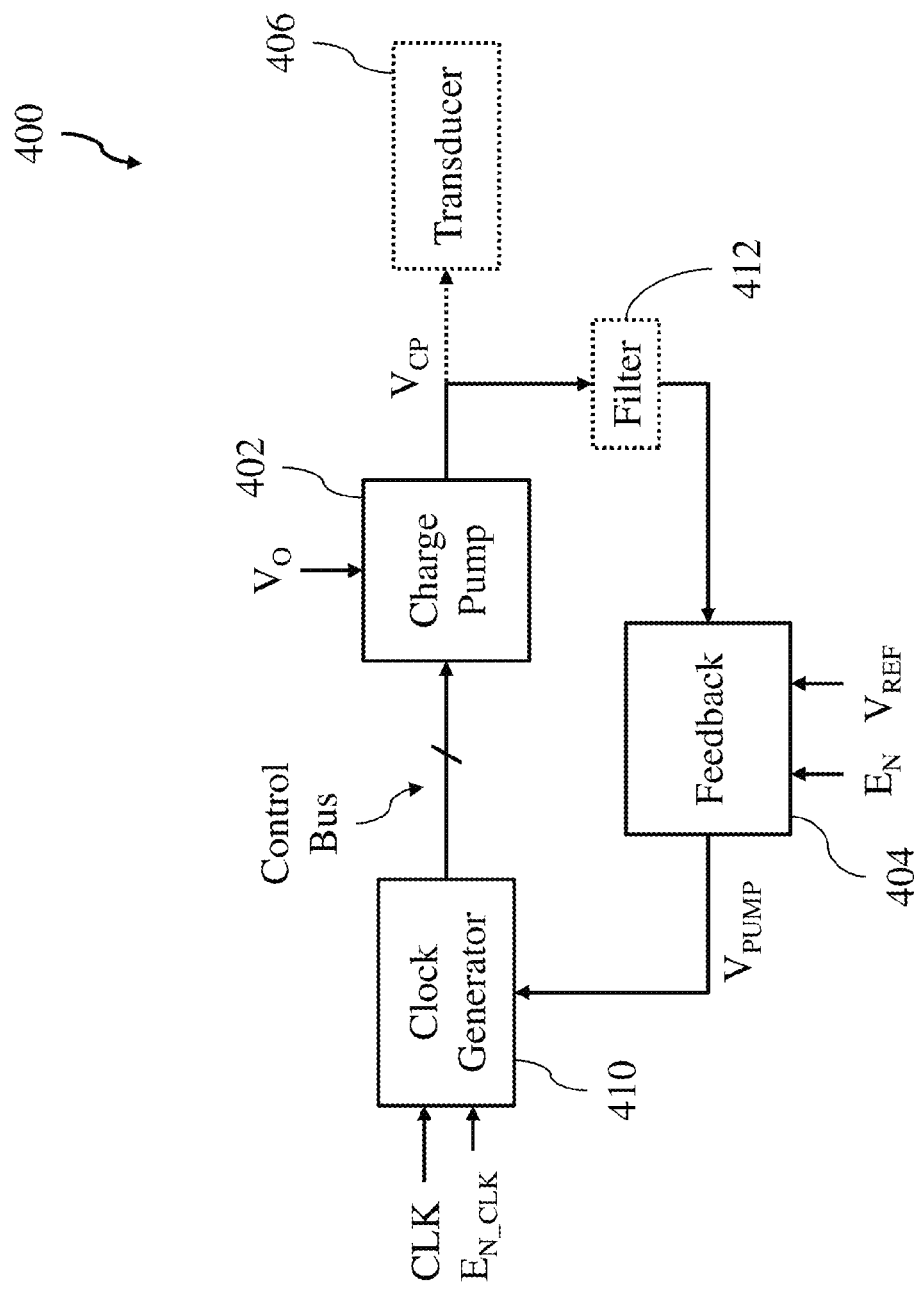
FIG. 4 illustrates a block diagram of another embodiment charge pump system.

FIG. 4 illustrates a block diagram of another embodiment charge pump system 400 including charge pump 402, feedback block 404, and clock generator 410. According to various embodiments, charge pump 402 provides a bias voltage or charge pump signal $V_{CP}$ at an output. In some embodiments, charge pump 402 supplies charge pump signal $V_{CP}$ to transducer 406, which may be a MEMS microphone for example. In alternative embodiments, charge pump signal $V_{CP}$ is connected to any device or circuit other than a transducer. As shown, charge pump 402 receives control inputs from a control bus and offset voltage signal $V_O$. In various embodiments, the control inputs determine charge pump signal $V_{CP}$, which may affect a bias voltage applied to transducer 406.

Similar to embodiments described above, charge pump signal $V_{CP}$ may also be supplied to a feedback block 404, which may be similar to the feedback loops described above in reference to FIGS. 1-3. In some embodiments, filter 412 is inserted between charge pump 402 and feedback block 404. Filter 412 may include resistive and capacitive components. In some embodiments, filter 412 may also include inductive and or active components. In a specific embodiment filter 412 may be a low-pass filter (LPF) or a high-pass filter (HPF). Filter 412 may also be placed between charge pump 402 and transducer 406. In other embodiments, filter 412 may be omitted.

In various embodiments, feedback block 404 receives charge pump signal $V_{CP}$ and generates a feedback signal in the form of pump voltage $V_{PUMP}$. Feedback block 404 may generate pump voltage $V_{PUMP}$ based on charge pump signal $V_{CP}$ and voltage reference signal $V_{REF}$. In some embodiments, voltage reference signal $V_{REF}$ may be a target voltage and differences between actual charge pump signal $V_{CP}$ and target voltage $V_{REF}$ cause $V_{PUMP}$ to vary in magnitude. As described previously, enable $E_N$ may function to enable or disable feedback block 404 and may be generated internally or externally with respect to feedback block 404.

As shown, clock generator 410 receives pump voltage $V_{PUMP}$ along with clock signal CLK and clock enable $E_{N\_CLK}$. Clock signal CLK may be a system clock and clock enable $E_{N\_CLK}$ may function to enable or disable clock generator 410. According to various embodiments, clock generator 410 generates switching signals on the control bus for controlling charge pump 402. Generally, the switching signals may operate to apply supply voltages, alternate polarity, and re-apply supply voltages to pump capacitors in charge pump 402. In various embodiments, the level of supply voltages applied to the pump capacitors, and therefore the resulting charge pump signal $V_{CP}$, is controlled by pump voltage $V_{PUMP}$. Thus, feedback block 404 may operate to control pump voltage $V_{PUMP}$ in order to raise or lower the supply voltages applied to the pump capacitors and consequently to raise or lower the output voltage of charge pump 402, i.e. charge pump signal $V_{CP}$.

Figure 5A:
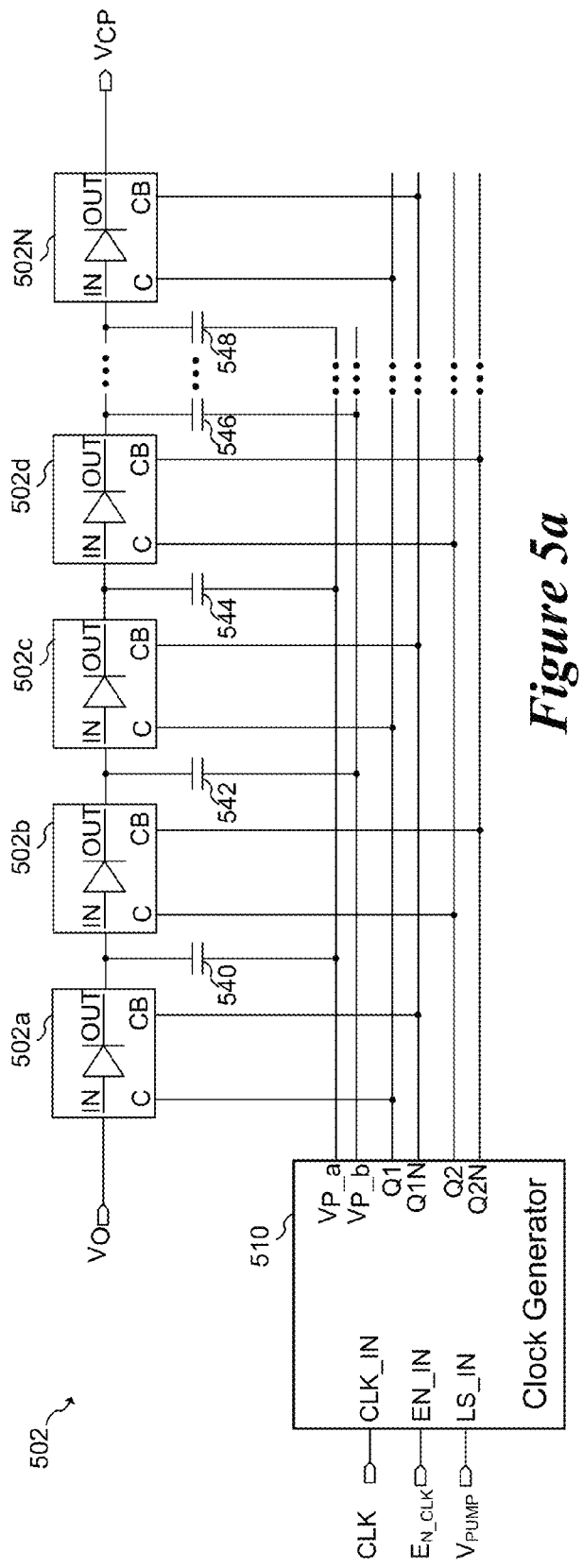
FIGS. 5a-5c illustrate circuit diagrams of an embodiment charge pump, an embodiment charge pump stage, and an embodiment clock generator.
Figure 5B:
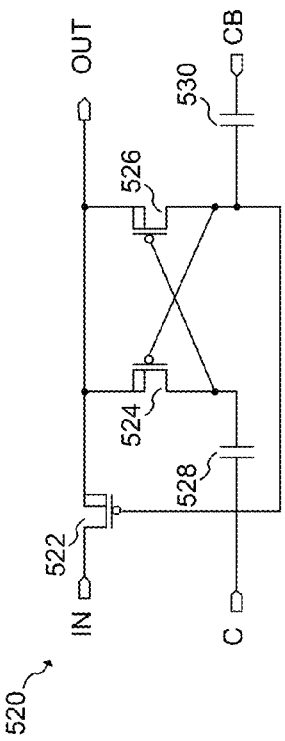
Figure 5C:
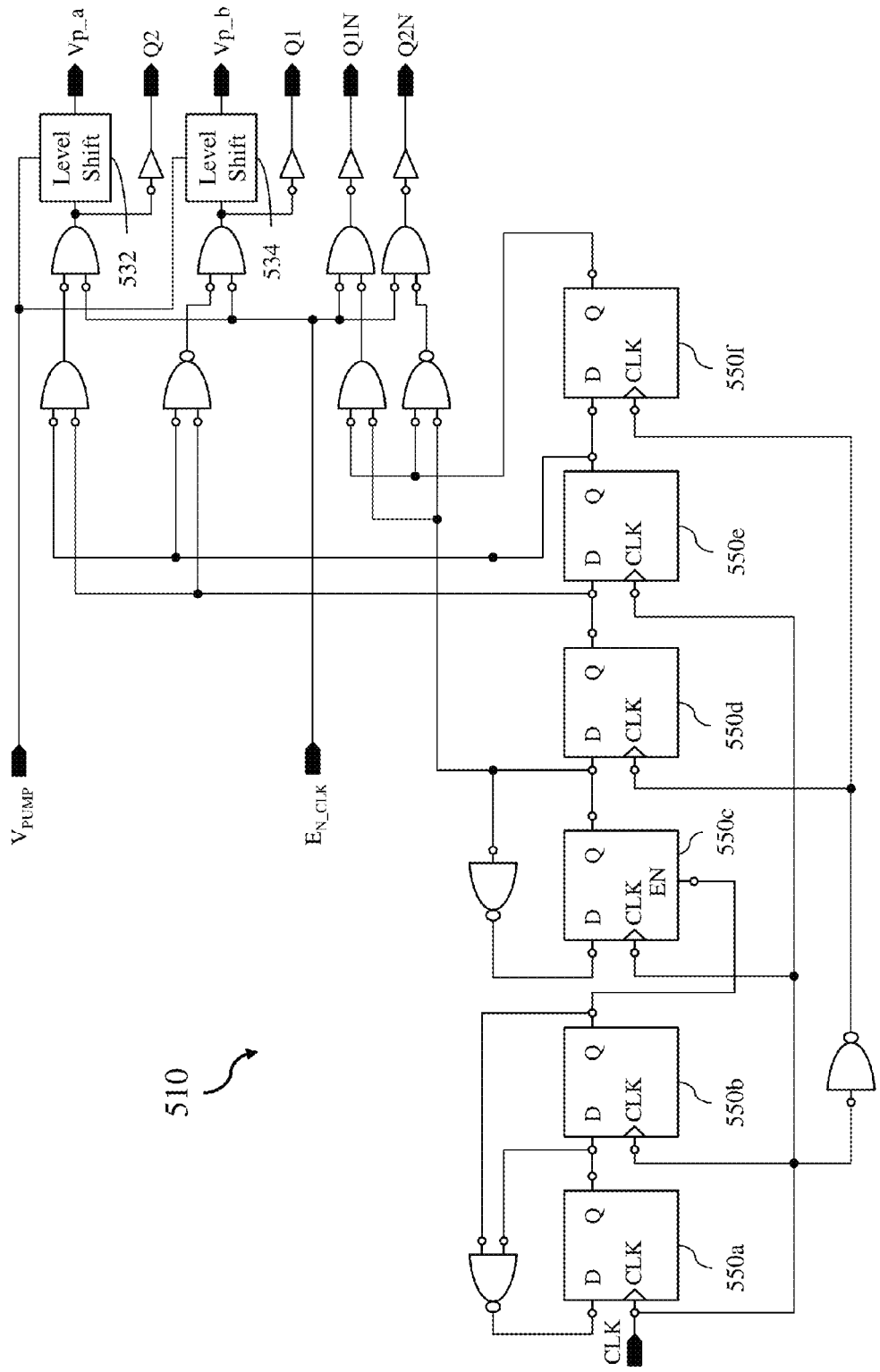

FIGS. 5a-5c illustrate circuit diagrams of an embodiment charge pump 502, an embodiment charge pump stage 520, and an embodiment clock generator 510 that may be used to implement any of the charge pumps in the previous figures, such as charge pump 102 in FIG. 1, for example, as well as charge pump 402 and clock generator 410 shown in FIG. 4, as further examples. FIG. 5a illustrates a top-level schematic of charge pump 502, which is used to provide a boosted voltage between about 2V and about 18V. Alternatively, voltages outside of this range are also possible depending on the particular application. In a specific embodiment, charge pump 502 is used to bias a MEMS microphone and/or capacitive sensor. As shown, clock generator 510 receives pump voltage $V_{PUMP}$ along with clock signal CLK and clock enable $E_{N\_CLK}$.

In an embodiment, a Dickson charge pump structure is used to provide boosted output voltage $V_{CP}$. Charge pump 502 is formed by pump capacitors 540, 542, 544, 546 and 548 coupled to charge pump stages 502a, 502b, 502c, 502d, and 502N. In one embodiment, nine functional diode blocks are used. Alternatively, any number of functional diode blocks may be used depending on the boosted voltage required. In an embodiment, offset voltage signal $V_O$ is fed into first charge pump stage 502a. In some embodiments, offset voltage signal $V_O$ may be buffered by an amplifier (not shown) before being fed to the first stage. Clock generator 510 provides control signals including first pump voltage $V_{P\_a}$, second pump voltage $V_{P\_b}$, and switching signals Q1, Q1N, Q2, and Q2N that drive pump capacitors 540, 542, 544, 546, and 548 and charge pump stages 502a, 502b, 502c, 502d, and 502N. The output of last charge pump stages 502N is coupled to output charge pump signal $V_{CP}$.

FIG. 5b illustrates an embodiment charge pump stage 520 that may be used to implement any of charge pump stages 502a-502N. As shown, charge pump stage 520 may have PMOS devices 522, 524, and 526 and input coupling capacitors 528 and 530. PMOS device 522 is a pass transistor that couples input IN of charge pump stage 520 to output OUT of charge pump stage 520. Cross coupled transistors 524 and 526 and input coupling capacitors 528 and 530 provide a boosted clock that shuts off transistor 522 at times during which the charge pump stage is in a non-conducting state. By using circuit 520, inefficiencies due to the threshold voltage of transistor 522 may be avoided. In alternative embodiments, a pn junction diode, a diode connected transistor, or other suitable device may be used in place of charge pump stage 520.

FIG. 5c illustrates a schematic of embodiment clock generator 510, which may be an implementation of clock generator 410 or any other clock generator discussed herein, for example, and which provides phased clocks for pump capacitors 540, 542, 544, 546, and 548, and charge pump stages 502a-502N in FIG. 5a. According to various embodiments, clock generator 510 receives pump voltage $V_{PUMP}$ along with clock signal CLK and clock enable $E_{N\_CLK}$ as inputs. Clock signal CLK may be a high speed system clock and clock enable EN_CLK may function to enable and disable output control signals for a control bus, such as the control bus shown in FIG. 4, for example. In the embodiment shown, clock generator 510 includes D-type flip flops (D-FFs) 550a-550f coupled together in order to function as a clock divider. That is to say, D-FFs 550a-550f function to divide clock signal CLK down to other frequencies for use as switching control signals on the outputs. In various embodiments, the outputs include first pump voltage $V_{P\_a}$, second pump voltage $V_{P\_b}$, and switching signals Q1, Q1N, Q2, and Q2N, as mentioned above. As shown, logic gates, including AND gates, NAND gates, and buffers, function to connect the clock dividing D-FFs 550a-550f to the output signals. Pump voltage $V_{PUMP}$ is coupled to level shifters 532 and 534 in order to change the voltage levels of first pump voltage $V_{P\_a}$ and second pump voltage $V_{P\_b}$ to be equal to pump voltage $V_{PUMP}$. First and second pump voltages $V_{P\_a}$ and $V_{P\_b}$ are coupled to pump capacitors 540, 542, 544, 546, and 548, and therefore control the output level of charge pump 502.

FIGS. 5a-5c illustrate one embodiment charge pump, charge pump stage, and clock generator; however, other types of charge pumps, charge pump stages, and/or clock generators may be used in order to implement any of the embodiments as described herein or any combination thereof.

Figure 6:
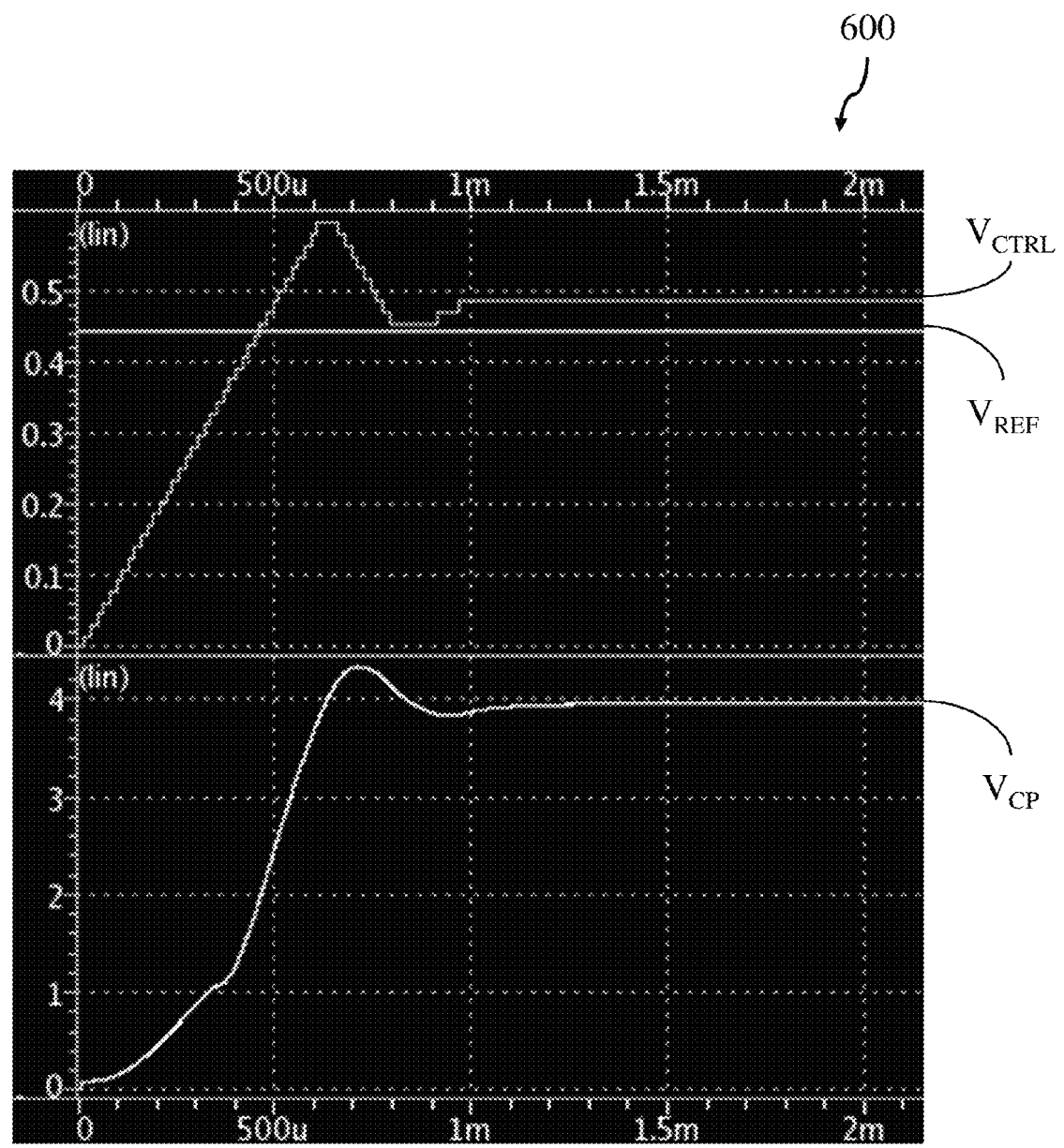
FIG. 6 illustrates a waveform diagram of an embodiment charge pump in operation.

FIG. 6 illustrates a waveform diagram 600 of an embodiment charge pump in operation. The bottom plot depicts an output voltage signal $V_{CP}$, such as charge pump signal $V_{CP}$ described in reference to the other figures. The top plot depicts a feedback waveform with voltage control signal $V_{CTRL}$ and reference voltage signal $V_{REF}$. In some embodiments, voltage control signal $V_{CTRL}$ may be a digital control signal, such as the output of counter 216 in FIG. 2, for example. Reference voltage signal $V_{REF}$ may be a target voltage or reference voltage $V_{REF}$ as described in reference to the other figures. As shown, when output voltage signal $V_{CP}$ is not at a steady state value, which steady state value may be equal to or nearly equal to reference voltage signal $V_{REF}$, voltage control signal $V_{CTRL}$ may vary towards reference voltage signal $V_{REF}$ by discrete steps. An overshoot is shown where voltage control signal $V_{CTRL}$ and output voltage signal $V_{CP}$ overshoot the steady state signal shown by reference voltage signal $V_{REF}$. In the embodiment shown, voltage control signal $V_{CTRL}$ stabilizes above reference voltage signal $V_{REF}$. In other embodiments, voltage control signal $V_{CTRL}$ may stabilize at or below reference voltage signal $V_{REF}$. In the embodiment shown, steady state is reached within about 1 ms. In other embodiments, steady state may be reached faster or slower that 1 ms. According to various embodiments, once steady state is reached, the feedback loop generating the voltage control signal $V_{CTRL}$, such as any of the feedback loops described herein, may be switched off in order to save power. The feedback loop may then be switched on again in response to a certain output condition or after a set time period. Consequently repeated cycles of enabling the feedback loop and disabling the feedback loop may be performed indefinitely during operation.

Figure 7:
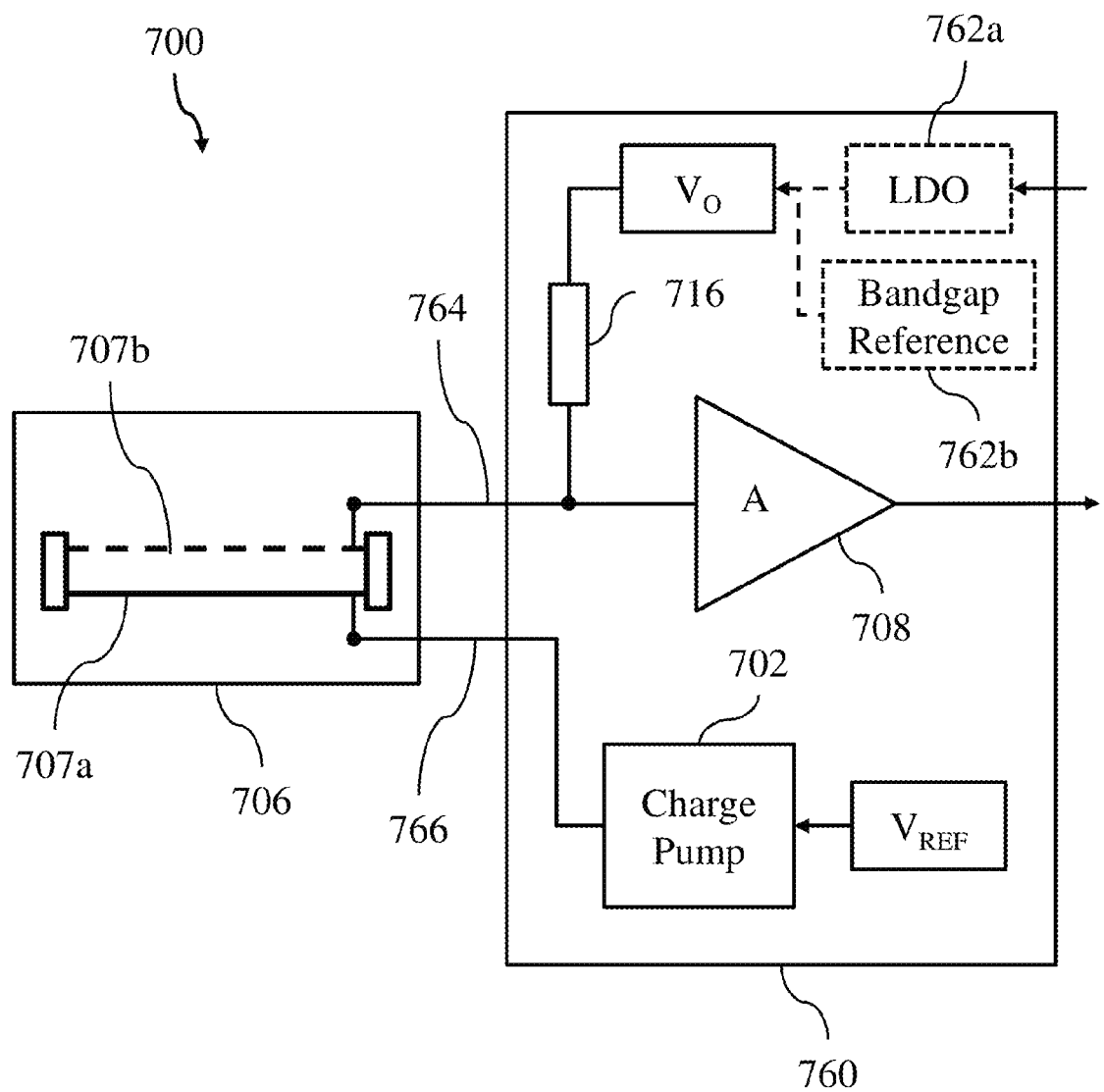
FIG. 7 illustrates a block diagram of an embodiment MEMS microphone system.

FIG. 7 illustrates a block diagram of an embodiment MEMS microphone system 700 including a MEMS microphone 706 and an interface circuit 760. As previously described in other figures, MEMS microphone 706 may include rigid backplate 707b and a deflectable membrane 707a. A sound wave incident on deflectable membrane 707a may cause the membrane to deflect, changing the distance separating membrane 707a from 707b and, due to the corresponding change in capacitance, generating a voltage or current signal on first and second terminals 764 and 766. Similar configurations with other types of transducers may also be implemented within the scope of embodiments described herein.

According to various embodiments, an offset voltage $V_O$ is supplied through a resistor 716 to first terminal 764 and the input of amplifier 708. In some embodiments, the offset voltage $V_O$ may be supplied by a low-dropout regulator (LDO) 761a. In other embodiments, the offset voltage $V_O$ is derived from a scaled bandgap voltage reference circuit 762b. In such embodiments, the bandgap voltage reference circuit may be implemented as any type of bandgap voltage reference circuit as is known in the art. The various embodiments may include either LDO 762a or bandgap reference 762b. Charge pump 702 may be coupled to second terminal 766. In such embodiments, a bias voltage applied to the MEMS microphone is dependent on charge pump 702 and offset voltage $V_O$. Charge pump 702 may receive a reference voltage $V_{REF}$. Operation of charge pump 702 may be similar to any other charge pumps as described herein and may further include any other inputs as described in reference to the other figures. For example, charge pump 702 may be coupled to receive offset voltage $V_O$, and/or may be couple to measure the voltage on first terminal 764. Charge pump 702 may also include an enable signal (not shown). In various embodiments, interface circuit 760 may be implemented as discrete components or as an integrated circuit (IC). Interface circuit 760 and MEMS microphone 706 may be disposed on a same semiconductor die or be formed on separate semiconductor dies and coupled together. In some embodiments, MEMS microphone 706 and interface circuit 760 are attached to a same printed circuit board (PCB) and encased in a same package.

Figure 8:
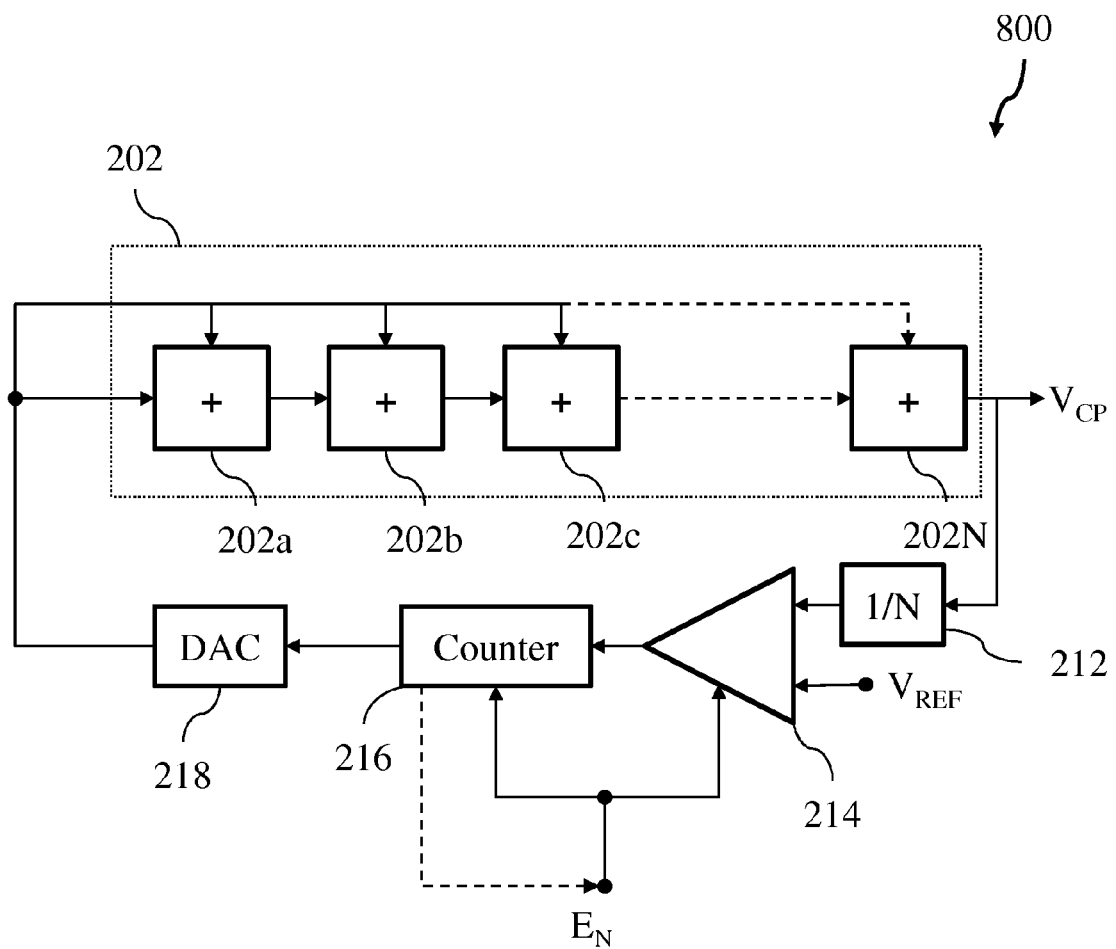
FIG. 8 illustrates a more detailed block diagram of an alternative embodiment charge pump system.

FIG. 8 illustrates a more detailed block diagram of an alternative embodiment charge pump system 800 including components similar to those described in reference to FIG. 2. Operation of the components and circuit in charge pump system 800 is similar to operation of charge pump system 200 in FIG. 2 except in that the first charge pump stage 202a does not receive an offset voltage signal $V_O$. Instead, the first charge pump stage 202a receives the output of DAC 218 as a voltage input. According to various embodiments, operation of charge pump 800 is as described previously with offset voltage signal $V_O$ replaced with the output of DAC 218.

Figure 9:
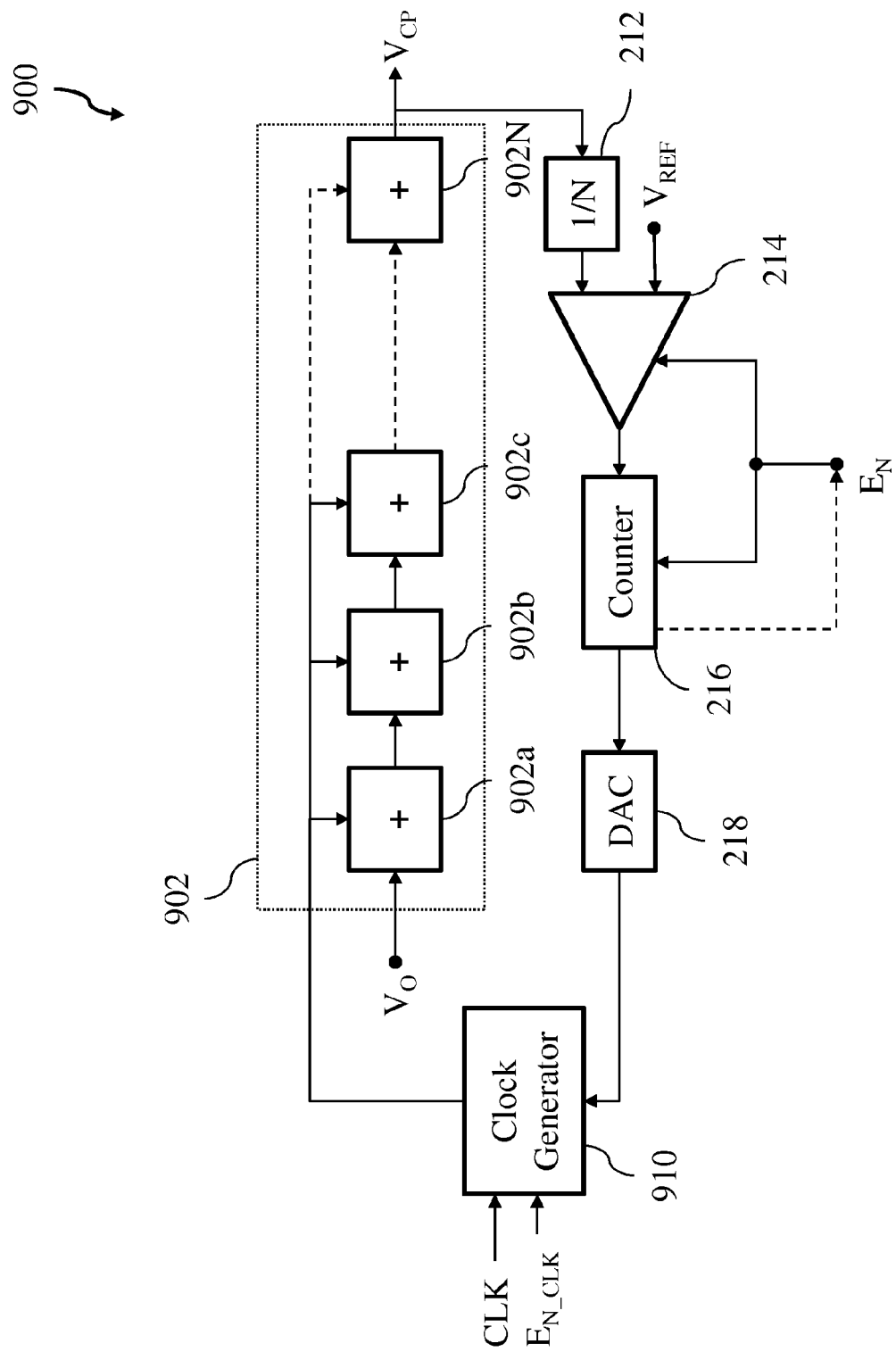
FIG. 9 illustrates a more detailed block diagram of another embodiment charge pump system.

FIG. 9 illustrates a more detailed block diagram of another embodiment charge pump system 900 that is similar to charge pump 200 in FIG. 2 with the added detail of clock generator 910. According to various embodiments, clock generator 910 functions as described in reference to clock generator 510 in FIG. 5c and operates in conjunction with charge pump stages 902a-902N as described in reference to charge pump states 502a-502N in FIGS. 5a and 5b. In some embodiments, clock generator 910 receives a feedback signal from DAC 218 and generates switching signals and levels for charge pump stages 902a-902N. Based on the switching signals and levels, charge pump stages 902a-902N output higher or lower voltages. Depending on the type of charge pump 902 used to implement the embodiments described herein, clock generator 910 may be omitted in some embodiments. According to various embodiments, all components in charge pump system 900 function in a manner as similarly described herein in reference to the other figures, such as FIGS. 2 and 4, for example. As such, any of the descriptions made herein may be applied to the components of FIG. 9.

Figure 10:
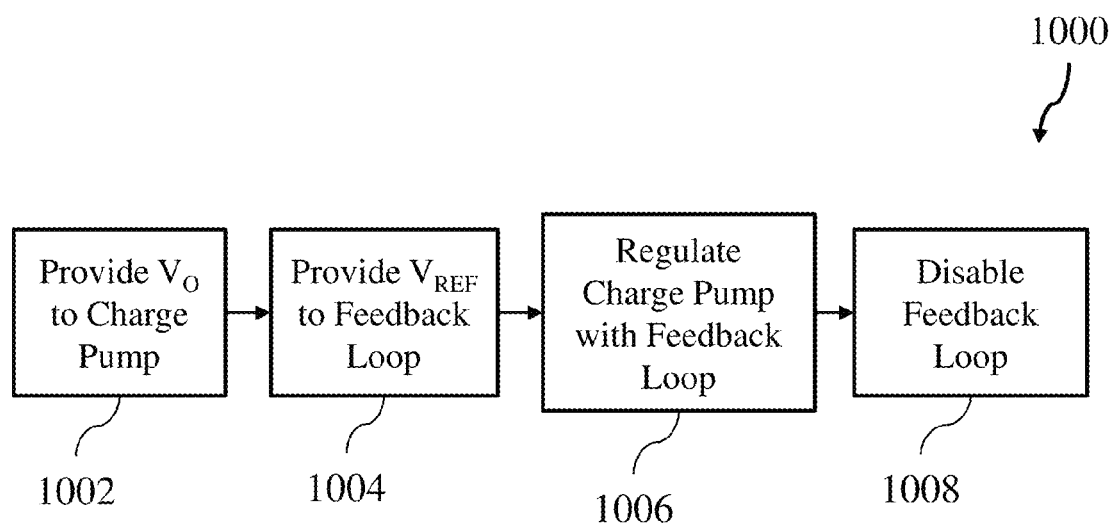
FIG. 10 illustrates a method of operation of an embodiment charge pump system.

FIG. 10 illustrates a method of operation 1000 of an embodiment charge pump system including steps 1002, 1004, 1006, and 1008. According to various embodiments, step 1002 includes providing an offset voltage signal $V_O$ to a charge pump. Step 1004 may include providing a reference voltage signal $V_{REF}$ to a feedback loop. Based on the provided signals in steps 1002 and 1004, step 1006 may include regulating the charge pump with the feedback loop. In such embodiments, both offset voltage signal $V_O$ and reference voltage signal $V_{REF}$ may be used to determine an output of the charge pump. In some embodiments, both the feedback loop and the charge pump function as a controlled system to regulate the charge pump output based on a feedback signal. Following step 1006, step 1008 may include disabling the feedback loop. In some embodiments, the feedback loop may be disabled once a steady state operation of the charge pump is reached. Steady state may refer to a stability of the charge pump output within a certain tolerance. In various embodiments, the feedback loop may be disabled in order to reduce power consumption. Further, the feedback loop may be re-enabled after a certain time or in response to circuit and or load conditions. In one embodiment, if the charge pump output drifts or changes beyond a certain tolerance the feedback loop is re-enabled. In various embodiments, the feedback loop is enabled during a control mode and the feedback loop is disabled during a glide mode, which may be referred to as first and second modes, respectively.

According to various embodiments, a circuit includes a charge pump including a first input, a second input configured to receive an offset signal, and an output terminal configured to provide a charge pump signal based on the first and second inputs. The circuit further includes a feedback circuit including a first input coupled to the output of the charge pump, a second input configured to be coupled to a reference signal, an enable input configured to enable and disable the feedback circuit, and a feedback output coupled to the first input of the charge pump.

In various embodiments, the offset signal is based on a signal at a first terminal. The charge pump and the feedback circuit are configured to maintain a substantially constant voltage between the output terminal and the first terminal. The circuit may further include an amplifier having an input coupled to the first terminal. The circuit may include a first circuit coupled between the first terminal and the output terminal. In some embodiments, the first circuit includes a transducer. The transducer may be a microelectromechanical system (MEMS) transducer.

In various embodiments, the feedback circuit further includes a comparator coupled to the first and the second inputs of the feedback circuit and configured to determine a difference between a signal at the output terminal of the charge pump and the reference signal. The feedback circuit may also include a counter configured to increment or decrement the feedback output based on the difference determined by the comparator. In such embodiments, both the comparator and the counter are coupled to the enable input. The feedback circuit may also include a digital to analog converter (DAC) coupled to the counter and configured to provide the feedback output, and the feedback circuit may include a divider coupled between the first input of the feedback circuit and the comparator and configured to divide the signal at the output terminal of the charge pump by a value N.

In various embodiments, the charge pump includes a plurality of stages. In such embodiments, a first stage in the plurality of stages is coupled to the first input, a last stage in the plurality of stages is coupled to the output terminal, and each stage of the plurality of stages is coupled to the counter. The charge pump may be configured to be coupled to a microelectromechanical system (MEMS) transducer. The enable input may include an enable circuit configured to receive an enable signal and may be operable to enable and disable the feedback circuit. In some embodiments, the enable signal is generated from within the feedback circuit. The circuit may also include an enable input terminal configured to receive the enable signal.

According to various embodiments, a charge pump includes a first input terminal configured to receive an offset signal, a second input terminal configured to receive a reference signal, an output terminal configured to provide a charge pump signal, a comparator coupled to the output terminal and the second input terminal and configured to receive a control signal, a counter coupled to the comparator and configured to receive the control signal, and a charge pump stage coupled to the first input terminal, the counter, and the output terminal.

In various embodiments, the charge pump also includes a digital to analog converter (DAC) coupled between the counter and the charge pump stage. The charge pump may include a plurality of stages, with a first stage in the plurality of stages coupled to the first input terminal, a last stage in the plurality of stages coupled to the output terminal, and each stage of the plurality of stages coupled to the counter. The charge pump may also include a divider coupled between the output terminal and the comparator. Such a divider is configured to divide the output by a value N.

In various embodiments, the counter is configured to provide the control signal. The charge pump may also include a third input terminal configured to receive the control signal. The control signal may be operable to disable and enable the comparator and the counter. The charge pump may be configured to be coupled to a transducer. In such embodiments, the transducer comprises a microelectromechanical system (MEMS) microphone.

According to various embodiments, a method of operating an electronic circuit includes providing an offset voltage to an input of a charge pump, providing a reference voltage to a feedback circuit for the charge pump, regulating an output of the charge pump with the feedback circuit during a first mode of operation, and disabling the feedback circuit during a second mode of operation. In such embodiments, the offset voltage is related to an electrical condition of a transducing element.

In various embodiments, the method also includes providing the output of the charge pump to a bias terminal of the transducing element. In such embodiments, the offset voltage is related to a voltage at a first terminal of the transducer and regulating the output of the charge pump includes maintaining a substantially constant voltage between the bias terminal of the transducer and the first terminal of the transducer.

In various embodiments, regulating an output of the charge pump with the feedback circuit includes comparing the reference voltage to the output of the charge pump and increasing or decreasing a magnitude of a feedback signal. In such embodiments, increasing or decreasing is dependent on the comparing. Increasing or decreasing the magnitude of the feedback signal may be performed using a counter. Regulating an output of the charge pump with the feedback circuit may also include converting the feedback signal from a digital feedback signal at an output of the counter to an analog feedback signal applied to the charge pump. Regulating an output of the charge pump with the feedback circuit may further include dividing the output of the charge pump by a first value before comparing the output to the reference voltage. In some embodiments, disabling the feedback circuit is dependent on a control signal. In such embodiments, a counter generates the control signal.

According to various embodiments, an electronic system includes a charge pump configured to be coupled to a first terminal of a transducer and an amplifier configured to be coupled to a second terminal of the transducer. The charge pump includes a plurality of charge pump stages and a feedback circuit coupled to an output of a last stage of the plurality of charge pump stages and to each stage of the plurality of charge pump stages. In such embodiments, a first stage of the plurality of charge pump stages is configured to receive an offset signal and the feedback circuit is configured to receive a control signal and a reference signal. Further, the offset signal is configured to be coupled to the second terminal of the transducer.

In various embodiments, the control signal is operable to enable and disable the feedback circuit. The feedback circuit includes a divider block, a comparator, a counter, and a digital to analog converter (DAC) coupled in series. The control signal may be generated in the counter. The offset signal may be generated by a voltage reference circuit. In some embodiments, the offset signal is generated by a low dropout regulator (LDO). In other embodiments, the offset signal is generated by a scaled bandgap voltage reference circuit. The electronic system may also include the transducer, and the transducer may include a microelectromechanical system (MEMS) microphone. In further embodiments, the charge pump is configured to maintain a substantially constant voltage between the first terminal of the transducer and the second terminal of the transducer when the offset signal changes.

Advantages of the various embodiments described herein may include increased transducer sensitivity and stability, reduced sensitivity to voltage supply variations, reduced power consumption, an offset voltage (Vo) that is independent of MEMS bias voltage selection, and an input offset voltage Vo that is easily modified without a change in MEMS bias voltage. Such advantages may be exhibited, for example, in the case of trimming of the bias voltage, when an ASIC is adapted to a different supply voltage, or when the input level is adjusted to allow for more signal headroom in a high sound pressure level (SPL) application.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
    a charge pump comprising:
        a first input,
        a second input configured to receive an offset signal, and
        an output terminal configured to provide a charge pump signal based on the first and second inputs;
    a feedback circuit comprising:
        a first input coupled to the output terminal of the charge pump,
        a second input configured to be coupled to a reference signal,
        an enable input configured to enable and disable the feedback circuit, and
        a feedback output coupled to the first input of the charge pump; and
    a first circuit comprising a first signal output terminal and a biasing input terminal coupled to the output terminal of the charge pump, wherein
        the first circuit is supplied by the charge pump signal at the biasing input terminal, and
        the offset signal is proportional to a signal at the first signal output terminal.

2. The circuit of claim 1, wherein the charge pump and the feedback circuit are configured to maintain a substantially constant voltage between the output terminal of the charge pump and the first signal output terminal.

3. The circuit of claim 1, further comprising an amplifier having an input coupled to the first signal output terminal.

4. The circuit of claim 1, wherein the first circuit comprises a transducer.

5. The circuit of claim 4, wherein the transducer comprises a microelectromechanical system (MEMS) transducer.

6. The circuit of claim 1, wherein the enable input comprises an enable circuit configured to receive an enable signal and is operable to enable and disable the feedback circuit.

7. The circuit of claim 6, wherein the enable signal is generated from within the feedback circuit.

8. The circuit of claim 6, further comprising an enable input terminal configured to receive the enable signal, wherein the enable signal is generated from outside the feedback circuit.

9. A circuit comprising:
    a charge pump comprising:
        a first input,
        a second input configured to receive an offset signal, and
        an output terminal configured to provide a charge pump signal based on the first and second inputs; and
    a feedback circuit comprising:
        a first input coupled to the output terminal of the charge pump,
        a second input configured to be coupled to a reference signal,
        an enable input configured to enable and disable the feedback circuit,
        a feedback output coupled to the first input of the charge pump,
        a comparator coupled to the first input of the feedback circuit and the second input of the feedback circuit and configured to determine a difference between the charge pump signal at the output terminal and the reference signal, and
        a counter configured to increment or decrement the feedback output based on the difference determined by the comparator, wherein both the comparator and the counter are coupled to the enable input.

10. The circuit of claim 9, wherein the feedback circuit further comprises:
    a digital to analog converter (DAC) coupled to the counter and configured to provide the feedback output; and a divider coupled between the first input of the feedback circuit and the comparator and configured to divide the signal at the output terminal of the charge pump by a value N.

11. The circuit of claim 9, wherein the charge pump comprises a plurality of stages, wherein a first stage in the plurality of stages is coupled to the first input, a last stage in the plurality of stages is coupled to the output terminal, and each stage of the plurality of stages is coupled to the counter.

12. A method of operating an electronic circuit, the method comprising:
providing a variable offset voltage to an input of a charge pump, wherein the variable offset voltage varies in relation to an electrical condition of a transducing element;
providing a reference voltage to a feedback circuit for the charge pump;
regulating an output of the charge pump with the feedback circuit during a first mode of operation; and
disabling the feedback circuit during a second mode of operation.

13. The method of claim 12, further comprising providing the output of the charge pump to a bias terminal of the transducing element.

14. The method of claim 13, wherein
the variable offset voltage is related to a voltage at a first terminal of the transducing element; and
regulating the output of the charge pump comprises maintaining a substantially constant voltage difference between the bias terminal of the transducing element and the first terminal of the transducing element.

15. The method of claim 13, further comprising providing the variable offset voltage to a further terminal of the transducing element.

16. The method of claim 12, wherein regulating the output of the charge pump with the feedback circuit comprises:
comparing the reference voltage to the output of the charge pump; and
increasing or decreasing a magnitude of a feedback signal, wherein increasing or decreasing is dependent on the comparing.

17. The method of claim 16, wherein increasing or decreasing the magnitude of the feedback signal is performed using a counter.

18. The method of claim 17, wherein regulating the output of the charge pump with the feedback circuit further comprises converting the feedback signal from a digital feedback signal at an output of the counter to an analog feedback signal applied to the charge pump.

19. The method of claim 16, wherein disabling the feedback circuit is dependent on a control signal.

20. The method of claim 19, further comprising generating the control signal at a counter.

21. An electronic system comprising:
a charge pump configured to be coupled to a first terminal of a transducer, the charge pump comprising:
a plurality of charge pump stages, wherein a first stage of the plurality of charge pump stages is configured to receive an offset signal, and
a feedback circuit coupled to an output of a last stage of the plurality of charge pump stages and to each stage of the plurality of charge pump stages, wherein the feedback circuit is configured to receive a control signal and a reference signal; and
an amplifier configured to be coupled to a second terminal of the transducer, wherein the offset signal is further configured to be coupled to the second terminal of the transducer.

22. The electronic system of claim 21, wherein the control signal is operable to enable and disable the feedback circuit.

23. The electronic system of claim 22, wherein the feedback circuit comprises a divider block, a comparator, a counter, and a digital to analog converter (DAC) coupled in series.

24. The electronic system of claim 22, wherein the offset signal is generated by a voltage reference circuit.

25. The electronic system of claim 21, further comprising the transducer, wherein the transducer comprises a microelectromechanical system (MEMS) microphone.

26. The electronic system of claim 21, wherein the charge pump is configured to maintain a substantially constant voltage between the first terminal of the transducer and the second terminal of the transducer when the offset signal changes.

* * * * *